United States Patent

[11] 3,619,107

| | | | | |
|---|---|---|---|---|
| [72] | Inventors | Hans Schladetsch, Frankfurt/Main; Erich Brenneisen, Hofheim/Taunus; Helmut Lindner, Frankfurt/Main; Heinz Schmidt, Kelkheim/Taunus, all of Germany | [51] | Int. Cl. .................................................. D06p 1/02, C09b 29/38 |
| [21] | Appl. No. | 812,885 | [50] | Field of Search............................................ 8/41, 50; 260/163 |
| [22] | Filed | Apr. 2, 1969 | [56] | References Cited |
| [45] | Patented | Nov. 9, 1971 | | UNITED STATES PATENTS |
| [73] | Assignee | Farbwerke Hoechst Aktiengesellschaft vormals Meister Lucius & Bruning Frankfurt/Main, Germany | 3,356,673 12/1967 Favre ........................... 260/163 |
| [32] | Priority | Apr. 20, 1968 | Primary Examiner—George F. Lesmes |
| [33] | | Germany | Assistant Examiner—Patricia C. Ives |
| [31] | | P 17 69 214.7 | Attorney—Curtis, Morris and Safford |

[54] PROCESS FOR DYEING, PADDING AND PRINTING OF SYNTHETIC FIBERS WITH MONOAZO DYESTUFFS OF A DIAZOTIZED AMINOBENZENE AND AMINOPHENYLMETHYLPYRAZOLONE
3 Claims, No Drawings

[52] U.S. Cl. ........................................................ 8/41, 260/163, 8/50

ABSTRACT: Process for the dyeing, padding and printing of fibrous materials consisting of or containing cellulose acetate, linear polyamide, polyurethane and polyester fibers by treating the said materials with water-insoluble monoazo dyestuffs obtained from the reaction of a diazotized aminobenzene with a 1-(3'- or 4'-amino-phenyl)-3-methyl-pyrazolone-(5).

PROCESS FOR DYEING, PADDING AND PRINTING OF SYNTHETIC FIBERS WITH MONOAZO DYESTUFFS OF A DIAZOTIZED AMINOBENZENE AND AMINOPHENYLMETHYLPYRAZOLONE

The present invention relates to a process for the dyeing, padding and printing of synthetic fibers.

We have found that water-insoluble monoazo dyestuffs of the general formula I

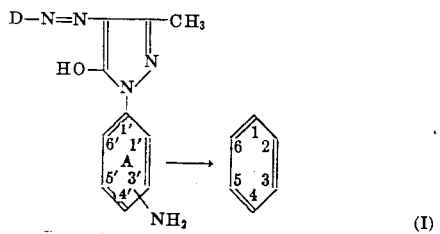

(I)

in which D represents the radical of a diazo component of the benzene series which may carry substituents with the exception of water-solubilizing groups and the amino group stands in the 3'- or the 4'-position at the benzene nucleus A which may further be substituted by a halogen atom, a lower alkyl or alkoxy group, are suitable for the dyeing, padding or printing of hydrophobic, synthetic organic textile fibers, for example cellulose triacetate fibers, cellulose 2 ½-acetate fibers, linear polyamide and polyurethane fibers, but above all linear polyester fibers, for example polyethylene-glycol terephthalate fibers. The water-insoluble monoazo dyestuffs are worked in the usual manner with dispersing agents to yield dyeing preparations. Said preparations give on the mentioned synthetic fibers dyeings and prints of very good building up and having a very high tinctorial strength as well as very good fastness regarding the maintenance of the color identity of shade during processing and use, among which properties especially the fastness to light and to wet treatment and the resistance to heat are particularly outstanding.

These aminoazo dyestuffs are obtained by coupling the diazonium compound of an amine of the general formula II

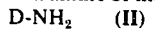

D—NH₂ (II)

with a 1-(3'-or 4'-amino-phenyl)-3-methyl- pyrazolone-(5) of the general formula III

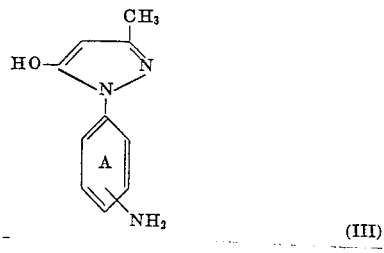

(III)

the nucleus A of which may be further substituted, especially by a halogen atom, a lower alkyl or alkoxy group.

Substituents of the phenyl ring D may be, for example, aliphatic groups which are preferably saturated and contain one to four carbon atoms, for example the methyl, ethyl, propyl or isopropyl group, alkoxy groups, particularly those containing one to four carbon atoms, for example the methoxy, ethoxy or butoxy group, or acylamino groups, preferably carbacyl-amino groups and among these especially lower alkanoylamino groups, such as the acetylamino group, or unsubstituted benzoylamino groups or benzoylamino groups which are substituted by halogen atoms or alkyl groups.

Preferably, however, D contains electrophilic substituents, in particular the nitro, trifluoromethyl or cyano group, furthermore halogen atoms such as chlorine, bromine or iodine atoms, and aliphatic or aromatic acyl groups such as the formyl, acetyl or propionyl group, furthermore benzoyl groups which may be substituted by chlorine, bromine or lower alkyl groups, furthermore carboxylic acid ester groups and lower alkyl-sulfonyl groups, finally also sulfonic acid-mono-(lower alkyl)- di-(lower alkyl)-amide groups.

According to the invention, the mentioned dyestuffs are suitable for the dyeing from an aqueous dispersion, of hydrophobic, synthetic organic textile fibers, for example for the dyeing of fibers of cellulose di- to tri-acetate, especially, however, for the dyeing of high molecular weight esters of aromatic polycarboxylic acids with polyfunctional alcohols, for example of polyethylene-glycol terephthalate fibers. The dyestuffs may also be used for the dyeing of synthetic linear polyamide and polyurethane fibers.

The dyeing according to the invention of polyester fibers with the mentioned dyestuffs from aqueous dispersions is preferably effected at temperatures of more than 100° C. and under pressure. The dyeing may also be carried out at the boiling temperature of water, in the presence of color transferring agents, so-called "carriers," for example phenyl-phenol, polychlorobenzene-compounds or similar auxiliary agents. Furthermore, intense dyeings are obtained by impregnating fabrics or knit fabrics of polyester materials with suspensions of the new dyestuffs and then subjecting the goods for a short time to the action of heat, for example to a temperature in the range of from 180° to 210° C. The affinity of the dyestuffs to the fibers can be improved in the individual cases by mixing two or more of the mentioned aminoazo dyestuffs. Depending on the composition and mixture of the dyestuffs, intense yellow to orange dyeings that have a very good fastness to wet treatment, to sublimation, to waste gases and to light and a very good building up can be produced on polyester fibers. When mixed fabrics made from polyester fibers and wool are dyed, the mentioned dyestuffs dye the wool portion only slightly, whereas the polyester portion is dyed intensely. The dyeing of the wool portion can easily be removed by washing the fabric with emulsifiers or by a treatment with reducing agents.

The following examples illustrate the invention, but they are not intended to limit it thereto; the parts by weight having the same relation to the parts by volume as the kilogram to the liter.

EXAMPLE 1

16.8 parts by weight of 3-nitro-4-amino-anisole were diazotized, at 0-5° C., in a mixture of 400 parts by volume of water and 35 parts by weight of concentrated hydrochloric acid with a solution of 6.9 parts by weight of sodium nitrite in 50 parts by volume of water. The clarified solution of the diazonium salt was added dropwise, at 0-5° C., to a sodium acetate-containing solution of 18.9 parts by weight of 1-(3'-aminophenyl)-3-methyl-pyrazolone-(5) and four parts by weight of sodium hydroxide in 200 parts by volume of water. When coupling was completed, the dyestuff that had formed was filtered off, washed with water until neutral and dried at 60° C. under reduced pressure. The dyestuff constituted an orange powder and its composition corresponded to the formula

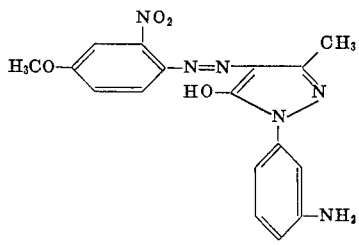

This dyestuff dyed linear polyester fibers, with good color yield, reddish-yellow shades having high-tinctorial strength. The dyeings have an outstanding fastness to washing, to sublimation and to light. On linear polyamide fibers as well as on fibers of cellulose triacetate and cellulose 2 ½ acetate, likewise intense reddish-yellow dyeings having very good properties of fastness were obtained by the conventional dyeing methods.

When using in the above example, instead of 16.8 parts by weight of 3-nitro-4-amino-anisole, equivalent amounts of the amines indicated in column 2 of the following table I as diazo components and combining them according to the indications of said example with 18.9 parts by weight of 1-(3'-aminophenyl)-3-methyl-pyrazolone-(5), dyestuffs were obtained which yielded on polyethylene-glycol terephthalate fibers similarly fast dyeings the shades of which are listed in column 3 of table 1.

TABLE I

| No. | Amine | Shade on linear polyester fibers |
|---|---|---|
| 2 | Aniline | yellow |
| 3 | 2-nitro-aniline | reddish yellow |
| 4 | 3-nitro-aniline | reddish yellow |
| 5 | 4-nitro-aniline | reddish yellow |
| 6 | 4-nitro-2-amino-anisole | reddish yellow |
| 7 | 5-nitro-2-amino-anisole | yellow |
| 8 | 2-nitro-5-amino-anisole | reddish yellow |
| 9 | 2-nitro-4-amino-anisole | reddish yellow |
| 10 | 6-nitro-3-amino-4-methoxy-toluene | reddish yellow |
| 11 | 2,4-dimethyl-aniline | yellow |
| 12 | 3-nitro-4-amino-toluene | reddish yellow |
| 13 | 3-nitro-2-amino-toluene | yellow |
| 14 | 5-nitro-2-amino-toluene | reddish yellow |
| 15 | 6-nitro-3-amino-toluene | reddish yellow |
| 16 | 5-nitro-2-amino-benzonitrile | brown |
| 17 | 2-amino-benzoic acid methyl ester | yellow |
| 18 | 3-amino-benzoic acid methyl ester | yellow |
| 19 | 2,5-dichloro-aniline | yellow |
| 20 | 4-chloro-aniline | yellow |
| 21 | 2,4,6-tribromo-aniline | yellow |
| 22 | 2-chloro-4-amino-anisole | reddish yellow |
| 23 | 2,6-dinitro-aniline | brown |
| 24 | 2,6-dinitro-4-chloro-aniline | brown |
| 25 | 4-nitro-2,6-dichloro-aniline | brown |
| 26 | 4-nitro-2,6-diiode-aniline | brown |
| 27 | 4-nitro-2-chloro-aniline | reddish yellow |
| 28 | 2,5-dimethoxy-aniline | reddish yellow |
| 29 | 3-amino-benzaldehyde | reddish yellow |
| 30 | 4-amino-benzaldehyde | reddish yellow |
| 31 | 3-amino-acetanilide | reddish yellow |
| 32 | 4-amino-acetanilide | yellow |
| 33 | 2-amino-anisole-4-sulfonic acid diethylamide | yellow |
| 34 | 2-amino-anisole-4-sulfonic acid methylamide | yellow |

EXAMPLE 35

15.5 parts by weight of 3-nitro-4-amino-toluene were diazotized at 0–5° C., in a mixture of 400 parts by volume of water and 35 parts by weight of concentrated hydrochloric acid with a solution of 6.9 parts by weight of sodium nitrite in 50 parts by volume of water. The clarified solution of the diazonium salt was added dropwise, at 0–5° C., to a sodium acetate-containing solution of 18.9 parts by weight of 1-(4'-amino-phenyl)-3-methyl-pyrazolone-(5) and four parts by weight of sodium hydroxide in 200 parts by volume of water. When coupling was completed, the dyestuff that had formed was filtered off, washed with water until neutral and dried at 60° C. under reduced pressure. The dyestuff constituted a brown powder, the composition of which corresponded to the formula

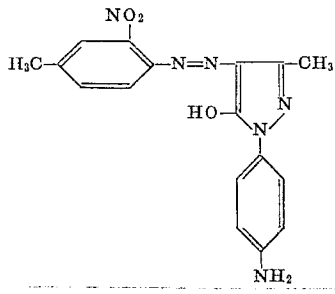

This dyestuff dyed linear polyester fibers with good color yield yellow shades. The dyeings showed an excellent fastness to washing, to sublimation and to light.

When using in example 35, instead of the 15.5 parts by weight of 3-nitro-4-amino-toluene, equivalent amounts of the amines indicated in column 2 of table II as diazo components and combining them according to the indications of the said example with 18.9 parts by weight of 1-(4'-aminophenyl)-3-methyl-pyrazolone-(5), dyestuffs were obtained which yielded on polyethylene-glycol terephthalate fibers similarly fast dyeings the shades of which are indicated in column 3 of table II

TABLE II

| No. | Amine | Shade on linear polyester |
|---|---|---|
| 36 | 2-nitro-aniline | yellow |
| 37 | 4-nitro-aniline | yellow |
| 38 | 3-nitro-4-amino-anisole | yellow |
| 39 | 5-nitro-2-amino-anisole | yellow |
| 40 | 2-nitro-5-amino-anisole | Yellow |
| 41 | 4-nitro-2,6-dichloro-aniline | yellow |
| 42 | 4-nitro-2,6-diiode-aniline | Yellow |
| 43 | 2,5-dichloro-aniline | yellow |
| 44 | 3,5-dinitro-2-amino-anisole | yellow |
| 45 | 5-nitro-2-amino-benzonitrile | yellow |
| 46 | 2,5-dimethoxy-aniline | orange |
| 47 | 4-nitro-2-amino-anisole | yellow |
| 48 | 4-chloro-aniline | reddish yellow |
| 49 | 2-chloro-4-amino-anisole | yellow |
| 50 | 3-nitro-2-amino-toluene | yellow |
| 51 | 4-nitro-2-chloro-aniline | yellow |
| 52 | 2-nitro-4-chloro-aniline | yellow |
| 53 | 4-nitro-2,5-dichloro-aniline | yellow |

Example 54

13.8 parts by weight of 4-nitroaniline were diazotized at 0–5° C., in a mixture of 400 parts by volume of water and 35 parts by weight of concentrated hydrochloric acid with a solution of 6.9 parts by weight of sodium nitrite in 50 parts by volume of water. The clarified diazonium solution was added slowly, while stirring, at 0–5° C., to a solution of 20.3 parts by weight of 1-(4'-methyl-3'-amino-phenyl)-3-methyl-pyrazolone-(5) in 200 parts by volume of water, containing four parts by weight of sodium hydroxide and 25 parts by weight of anhydrous sodium acetate. During coupling, the pH value should range between 4 and 5. The dyestuff that had precipitated was filtered off, washed and dried. It constituted a red-brown powder the composition of which corresponded to the formula

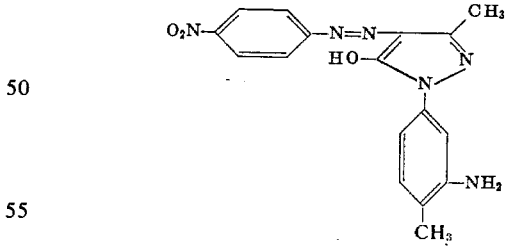

On linear polyester fibers, the dyestuff yielded intense dyeings showing reddish-yellow shades that had very good properties of fastness.

Example 55

The diazonium salt solution obtained according to example 1 from 16.8 parts by weight of 3-nitro-4-amino-anisole was added dropwise, at 0–5° C., to a solution of 22.4 parts by weight of 1-(3'-chloro-4'-aminophenyl)-3-methyl-pyrazolone-(5)in 200 parts by volume of water containing four parts by weight of sodium hydroxide and 25 parts by weight of anhydrous sodium acetate. Coupling was effected in the weakly acid range. When, after 1 to 2 hours, the formation of dyestuff was complete, the dyestuff that had precipitated was filtered off, washed with a large quantity of water until neutral and dried at 60° C. under reduced pressure. The dyestuff constituted a brown powder, the composition of which corresponded to the formula

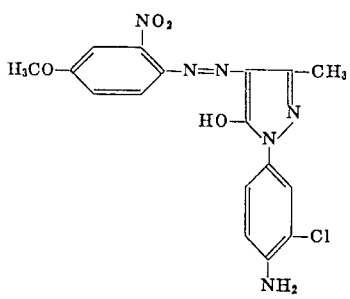

The dyestuff dyed linear polyester fibers from an aqueous dispersion intensely reddish-yellow shades that had very good properties of fastness.

Table III lists further dyestuffs which had been obtained according to the indications given in example 54 and 55 . In column 2 of this table are listed the amines of the diazo components and in column 3 are listed the coupling components reacted with them. The shades of the respective dyeings on polyethylene-glycol terephthalate fibers are indicated in column 4.

TABLE III

| No. | Amine | Coupling component | Shade on linear polyester fibers |
|---|---|---|---|
| 56 | 4-nitroaniline | 1-(3'-methyl-4'-amino-phenyl)-3-methyl-pyrazolone-(5). | Yellow. |
| 57 | do | 1-(3'-methoxy-4'-amino-phenyl)-3-methyl-pyrazolone-(5). | Do. |
| 58 | 3-nitro-4-aminoanisole | do | Do. |
| 59 | 4-nitroaniline | 1-(3'-chloro-4-amino-phenyl)-3-methyl-pyrazolone-(5). | Do. |
| 60 | 3-nitro-4-amino-anisole | 1-(3'-methyl-4'-amino-phenyl)-3-methyl-pyrazolone-(5). | Reddish yellow. |
| 61 | do | 1-(4'-methyl-3'-amino-phenyl)-3-methyl-pyrazolone-(5). | Yellow. |

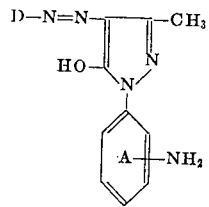

We claim:

1. A process for dyeing, padding or printing fibrous materials of cellulose acetate, linear polyamide, polyurethane or linear polyester which comprises applying to said fibrous materials by dyeing, padding or printing a water-insoluble monoazo dyestuff of the formula

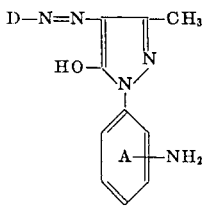

(1)

2. A process according to claim 1 in which a dyestuff of the formula

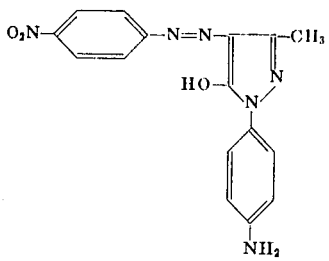

is used.

3. A textile material of cellulose acetate, linear polyamide, polyurethane or linear polyester fibers dyed or printed with a water-insoluble monoazo dyestuff of the formula